United States Patent
Farha et al.

(10) Patent No.: US 10,985,420 B2
(45) Date of Patent: Apr. 20, 2021

(54) BATTERY PACK WITH SLIDE-IN BATTERY ASSEMBLY

(71) Applicant: FORD GLOBAL TECHNOLOGIES, LLC, Dearborn, MI (US)

(72) Inventors: Eid Farha, Ann Arbor, MI (US); Hari Addanki, Novi, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 1304 days.

(21) Appl. No.: 15/004,122

(22) Filed: Jan. 22, 2016

(65) Prior Publication Data
US 2017/0214011 A1     Jul. 27, 2017

(51) Int. Cl.
*H01M 50/20*     (2021.01)

(52) U.S. Cl.
CPC ........ *H01M 50/20* (2021.01); *H01M 2220/20* (2013.01)

(58) Field of Classification Search
CPC ............. H01M 2/1077; H01M 2/1083; H01M 2220/20
See application file for complete search history.

(56) References Cited

U.S. PATENT DOCUMENTS

| | | | |
|---|---|---|---|
| 5,366,827 A | 11/1994 | Belanger et al. | |
| 6,475,659 B1 * | 11/2002 | Heimer | H01M 2/0262 |
| | | | 429/130 |
| 6,629,737 B2 * | 10/2003 | Wiggins | A47B 57/58 |
| | | | 180/68.5 |
| 8,409,744 B2 | 4/2013 | Ijaz et al. | |
| 2013/0189559 A1 | 7/2013 | Giere | |
| 2014/0038029 A1 * | 2/2014 | Thurmeier | H01M 2/1072 |
| | | | 429/156 |
| 2015/0004469 A1 * | 1/2015 | Park | H01M 2/1077 |
| | | | 429/151 |
| 2015/0072206 A1 | 3/2015 | Houchin-Miller et al. | |
| 2016/0006006 A1 * | 1/2016 | Motokawa | H01M 2/1077 |
| | | | 429/54 |

FOREIGN PATENT DOCUMENTS

WO     2015034585 A1     3/2015

* cited by examiner

*Primary Examiner* — Michael L Dignan
(74) *Attorney, Agent, or Firm* — David B. Kelley; Carlson, Gaskey & Olds

(57) ABSTRACT

A battery pack according to an exemplary aspect of the present disclosure includes, among other things, an enclosure and a battery assembly retained relative to the enclosure. One of the battery assembly and the enclosure includes a groove configured to receive a flange of the other of the battery assembly and the enclosure as the battery assembly is slid into engagement with the enclosure.

10 Claims, 5 Drawing Sheets

BATTERY PACK WITH SLIDE-IN BATTERY ASSEMBLY

TECHNICAL FIELD

This disclosure relates to a battery pack for an electrified vehicle. A battery assembly of the battery pack is configured to slideably engage an enclosure wall of the battery pack.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack for powering electric machines and other electrical loads typically includes multiple battery assemblies, or battery arrays, that include a plurality of interconnected battery cells. There is often a limited amount of space available within the electrified vehicle for accommodating the battery pack. Therefore, space efficient packaging designs are desired.

SUMMARY

A battery pack according to an exemplary aspect of the present disclosure includes, among other things, an enclosure and a battery assembly retained relative to the enclosure. One of the battery assembly and the enclosure includes a groove configured to receive a flange of the other of the battery assembly and the enclosure as the battery assembly is slid into engagement with the enclosure.

In a further non-limiting embodiment of the foregoing battery pack, an array plate of the battery assembly includes a first side region facing toward a battery cell and a second side region facing in a direction away from the battery cell.

In a further non-limiting embodiment of either of the foregoing battery packs, the flange or the groove is disposed on the second side region of the array plate.

In a further non-limiting embodiment of any of the foregoing battery packs, the groove extends horizontally across an array plate of the battery assembly or a wall of the enclosure.

In a further non-limiting embodiment of any of the foregoing battery packs, the battery assembly includes the flange and the enclosure includes the groove.

In a further non-limiting embodiment of any of the foregoing battery packs, the flange extends from an array plate of the battery assembly and the groove is formed in a wall of the enclosure.

In a further non-limiting embodiment of any of the foregoing battery packs, the battery assembly includes the groove and the enclosure includes the flange.

In a further non-limiting embodiment of any of the foregoing battery packs, the battery assembly includes a first array plate and a second array plate disposed at the longitudinal extents of the battery assembly, and each of the first array plate and the second array plate includes either the flange or the groove.

In a further non-limiting embodiment of any of the foregoing battery packs, either the battery assembly or the enclosure includes a plurality of flanges.

In a further non-limiting embodiment of any of the foregoing battery packs, the flange is L-shaped.

In a further non-limiting embodiment of any of the foregoing battery packs, at least one fastener extends through a wall of the enclosure and into an array plate of the battery assembly.

In a further non-limiting embodiment of any of the foregoing battery packs, the battery assembly includes a plurality of battery cells disposed between a first array plate and a second array plate.

A method according to another exemplary aspect of the present disclosure includes, among other things, sliding a battery assembly into an enclosure of a battery pack such that a flange of either the battery assembly or the enclosure engages a groove of the other of the battery assembly and the enclosure.

In a further non-limiting embodiment of the foregoing method, the sliding step includes sliding the battery assembly horizontally into the enclosure from an open side of the enclosure toward an opposite wall of the enclosure.

In a further non-limiting embodiment of either of the foregoing methods, the method includes positioning the battery assembly proximate to an open side of the enclosure, moving the battery assembly until the flange is received within the groove and after the moving step, performing the sliding step.

In a further non-limiting embodiment of any of the foregoing methods, the method includes sliding a second battery assembly into the enclosure such that the second battery assembly is positioned adjacent to the battery assembly.

In a further non-limiting embodiment of any of the foregoing methods, the flange is part of the battery assembly and the groove is part of the enclosure.

In a further non-limiting embodiment of any of the foregoing methods, the flange is part of the enclosure and the groove is part of the battery assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary space efficient battery pack designs that may be employed within an electrified vehicle. An exemplary battery pack includes an enclosure and a battery assembly retained relative to the enclosure. A flange is received within a groove to guide the battery assembly into place as it is slid into engagement with the enclosure. In some embodiments, the flange is part of the battery assembly and the groove is part of the enclosure. In other embodiments, the flange is part of the enclosure and the groove is part of the battery assembly. These and other features are discussed in greater detail in the following paragraphs of this detailed description.

Figure 1:
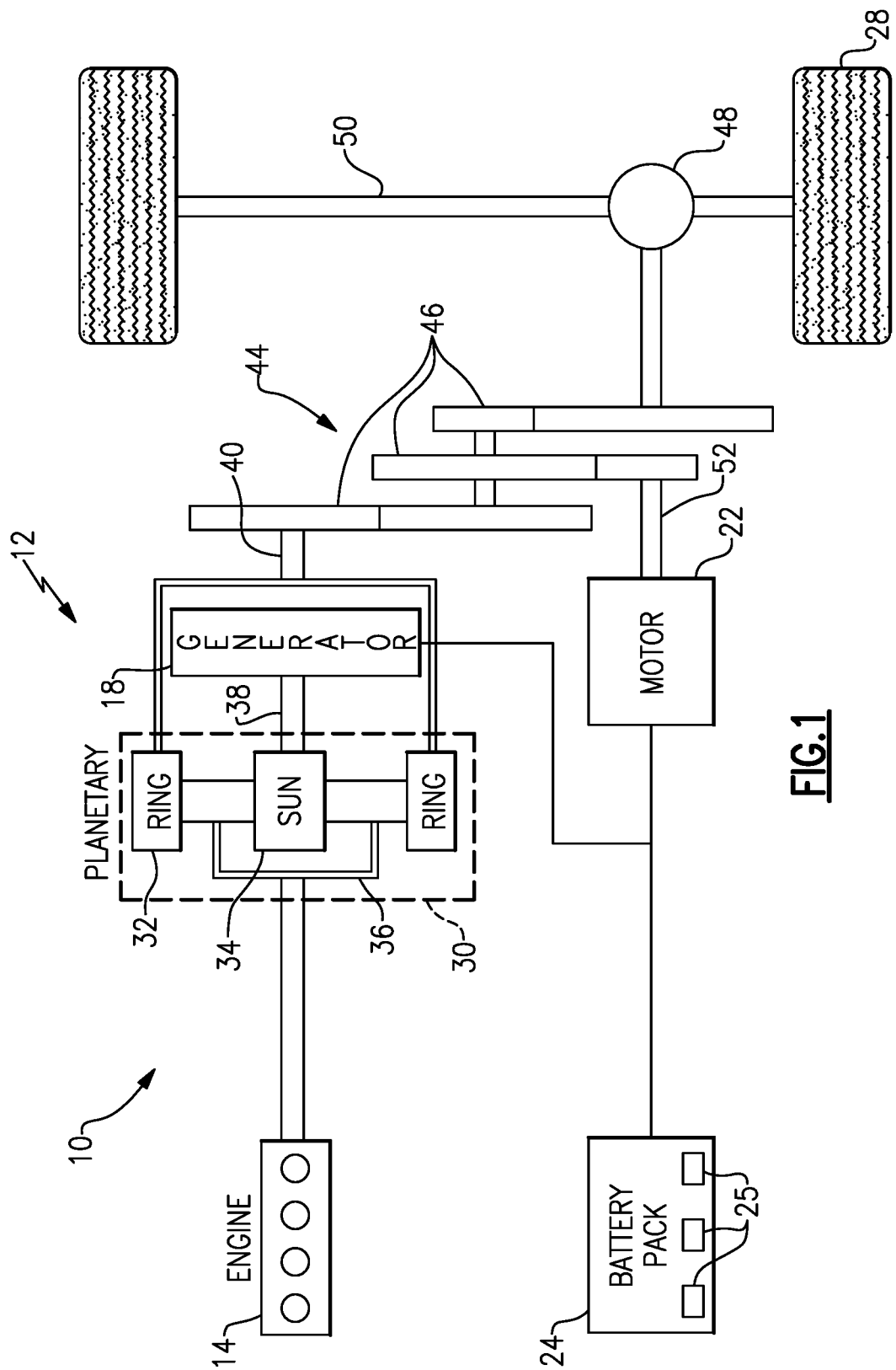
FIG. 1 schematically illustrates a powertrain of an electrified vehicle.

FIG. 1 schematically illustrates a powertrain 10 of an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
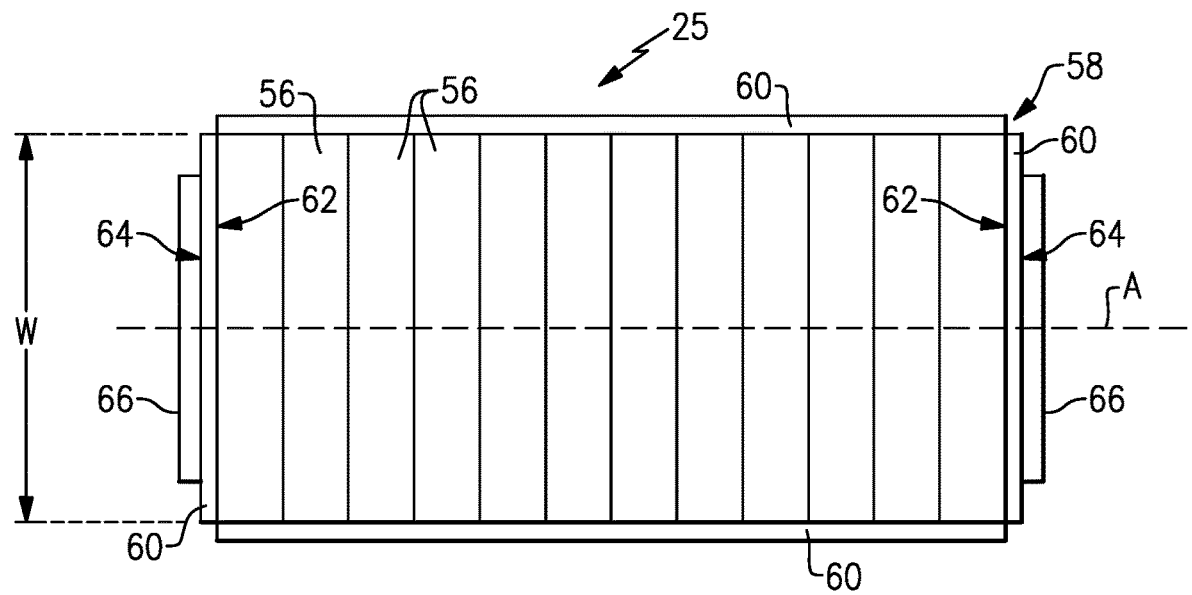
FIG. 2 is a top view of a battery assembly.

FIG. 2 illustrates a battery assembly 25 that can be employed within an electrified vehicle. For example, the battery assembly 25 could be part of the battery pack 24 of the electrified vehicle 12 of FIG. 1. The battery assembly 25 includes a plurality of battery cells 56 for supplying electrical power to various electrical loads of the electrified vehicle 12. Although a specific number of battery cells 56 are depicted in FIG. 2, the battery assembly 25 could employ a greater or fewer number of battery cells within the scope of this disclosure. In other words, this disclosure is not limited to the specific configuration shown in FIG. 2.

The battery cells 56 may be stacked side-by-side along a longitudinal axis A to construct a grouping of battery cells 56, sometimes referred to as a "cell stack." Of course, the battery cells 56 could be grouped in other configurations. In one non-limiting embodiment, the battery cells 56 are prismatic, lithium-ion cells. However, battery cells having other geometries (cylindrical, pouch, etc.), other chemistries (nickel-metal hydride, lead-acid, etc.), or both, are contemplated within the scope of this disclosure. Although not shown, spacers or separators may be positioned between adjacent battery cells 56 of the battery assembly 25. The spacers may be utilized to electrically isolate the battery cells 56 from one another.

The battery cells 56 are supported by a support structure 58 positioned around a periphery of the cell stack. The support structure 58 may include two or more array plates 60 that are configured to axially constrain the stacked battery cells 56. In one non-limiting embodiment, the array plates 60 are disposed at the longitudinal extents of the battery assembly 25 (see, e.g., FIGS. 4A and 4B). In other words, the array plates 60 could be configured as end plates of the support structure 58. In another non-limiting embodiment, the array plates 60 are disposed along the longitudinal sides of the battery assembly 25 (see, e.g., FIG. 7). In other words, the array plates 60 could be configured as side plates of the support structure 58. In yet another non-limiting embodiment, the support structure 58 could include array plates 60 disposed along both the sides and ends of the battery assembly 25 (see, e.g., FIG. 2).

The battery assembly 25 may be slid into an enclosure of the battery pack 24 in order to retain the battery assembly 25 within the battery pack 24. The battery assembly 25 and the battery pack enclosure include cooperating engagement features configured to guide the battery assembly 25 into the battery pack 24. Examples of such engagement features are detailed below.

Figure 3:
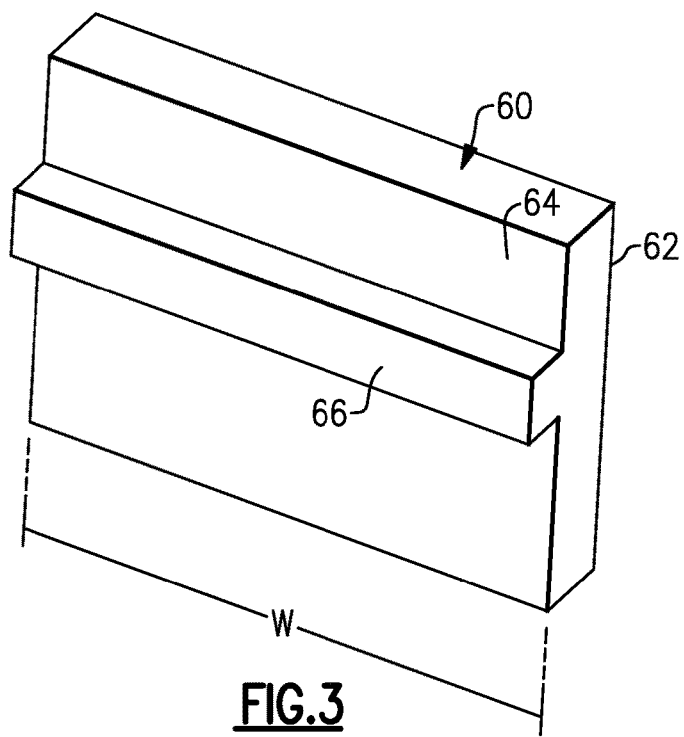
FIG. 3 illustrates an array plate of a battery assembly.

An exemplary array plate 60 is shown in FIG. 3. The array plate 60 could be representative of either an end plate or a side plate of the battery assembly 25 of FIG. 2. The array plate 60 could be made of either metallic materials (aluminum, steel, etc.) or plastic materials. The general size and shape of the array plate 60 is not intended to limit this disclosure.

The array plate 60 may include a first side region 62 and a second side region 64 opposite of the first side region 62. In one non-limiting embodiment, the first side region 62 faces toward the battery cells 56 of the battery assembly 25 and the second side region 64 faces in a direction away from the battery cells 56 (see FIG. 2).

The second side region 64 of the array plate 60 may include a flange 66. The flange 66 may be configured as a protruding member that extends from the array plate 60. For example, the flange 66 may protrude outwardly from the second side region 64 in a direction that extends away from the first side region 62 and may be disposed anywhere along the height of the second side region 64. The flange 66 may extend across an entire width W of the array plate 60 (see, e.g., FIG. 3), or could extend across only a portion of the width W (see, e.g., FIG. 2). In another non-limiting embodiment, the flange 66 is integral to the array plate 60. In yet another non-limiting embodiment, the flange 66 is a separate piece that is attachable to the array plate 60.

Figure 4A:
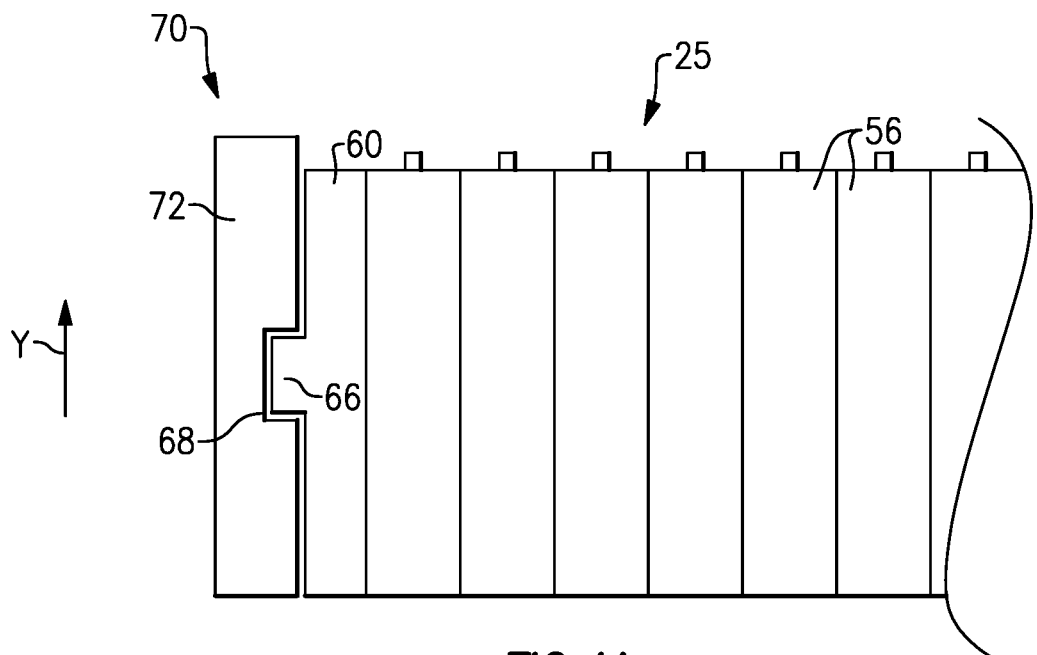
FIG. 4A is a side view of a battery pack.

Referring now to FIG. 4A, the battery assembly 25 may be retained relative to an enclosure 70 of the battery pack 24. The enclosure 70 includes a wall 72 positioned in proximity to the battery assembly 25. In the illustrated embodiment, the wall 72 is positioned adjacent to one of the array plates 60 of the battery assembly 25. In one non-limiting embodiment, each wall 72 of the enclosure 70 is an extruded part. However, other manufacturing techniques, including but not limited to casting techniques, can be used to form the walls 72 of the enclosure 70.

In one non-limiting embodiment, the wall 72 of the enclosure 70 includes a groove 68 positioned and sized to receive the flange 66 of the array plate 60 of the battery assembly 25. For example, the groove 68 may guide movement of the flange 66 as the battery assembly 25 is slid into engagement with the enclosure 70. The nested relationship between the flange 66 and the groove 68 is sufficient to constrain the battery assembly 25 in at least a vertical direction Y.

In one non-limiting embodiment, the groove 68 extends horizontally across the wall 72 of the enclosure 70. The groove 68 may embody any size and shape that is configured to accept the flange 66.

Figure 4B:
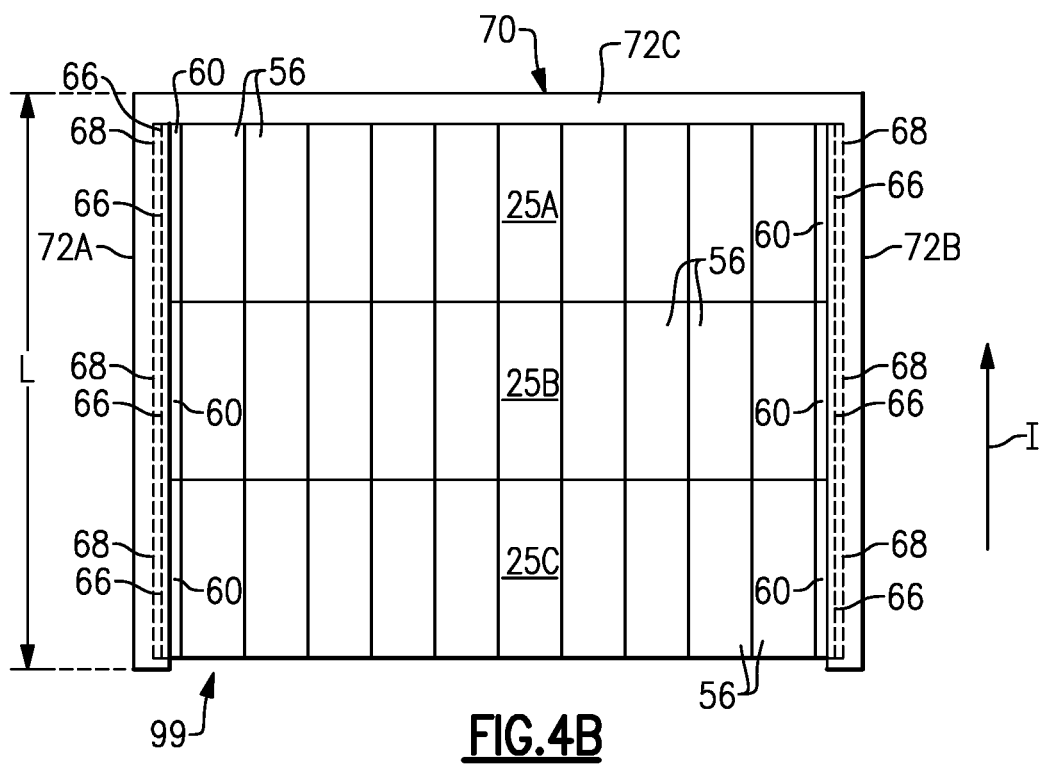
FIG. 4B is a top view of the battery pack of FIG. 4A.

Referring to FIG. 4B, the battery pack 24 may accommodate multiples battery assemblies 25. In this embodiment, three battery assemblies 25A, 25B and 25C are depicted. Although three battery assemblies 25 are shown, it should be understood that the battery pack 24 could include one or more battery assemblies.

Each battery assembly 25A, 25B and 25C is retained relative to the enclosure 70. The enclosure 70 includes a plurality of walls 72. In this non-limiting embodiment, the enclosure 70 includes walls 72A, 72B and 72C. A top wall or cover of the enclosure 70 is removed to better illustrate the internal contents of the battery pack 24.

Each battery assembly 25A, 25B and 25C of the battery pack 24 includes a plurality of battery cells 56 disposed between opposing array plates 60. In this embodiment, the array plates 60 are end plates and are therefore positioned at the longitudinal extents of each battery assembly 25A, 25B and 25C. Each array plate 60 includes a flange 66 that may be received within the grooves 68 of the walls 72A and 72B of the enclosure 70 to slide the battery assemblies 25 into engagement with the enclosure 70. In this non-limiting embodiment, opposing walls 72A, 72B of the enclosure 70 each include one groove 68 for accommodating the flange 66 of each of the opposing array plates 60 of the battery assemblies 25A, 25B and 25C. In one non-limiting embodiment, the grooves 68 extend across the entire length L of the walls 72A, 72B of the enclosure 70.

Each battery assembly 25A, 25B and 25C may be retained relative to the enclosure 70 as described by the following non-limiting embodiment. A first battery assembly 25A may be positioned proximate to an open side 99 of the enclosure 70, which is located opposite from a wall 72C of the enclosure 70. The wall 72C is generally perpendicular to the walls 72A, 72B, and is generally perpendicular to the direction of insertion I of the battery assembly 25A. In one non-limiting embodiment, the direction of insertion I is parallel to the length L of the walls 72A, 72B.

The battery assembly 25A may be positioned such that the flanges 66 of the array plates 60 are approximated relative to the grooves 68 of the walls 72A, 72B. Next, the battery assembly 25A is moved until the flanges 66 are received within the grooves 68 on both sides of the battery assembly 25A. The battery assembly 25A may then be slid horizontally into the enclosure 70 toward the opposite wall 72C. The grooves 68 guide the flanges 66 as the battery assembly 25A is slid further into the enclosure 70. This procedure may be repeated to position each additional battery assembly 25B, 25C of the battery pack 24. An additional wall (not shown) may be attached to the enclosure 70 at the open side 99 once all battery assemblies have been slid into the battery pack 24.

Figure 5:
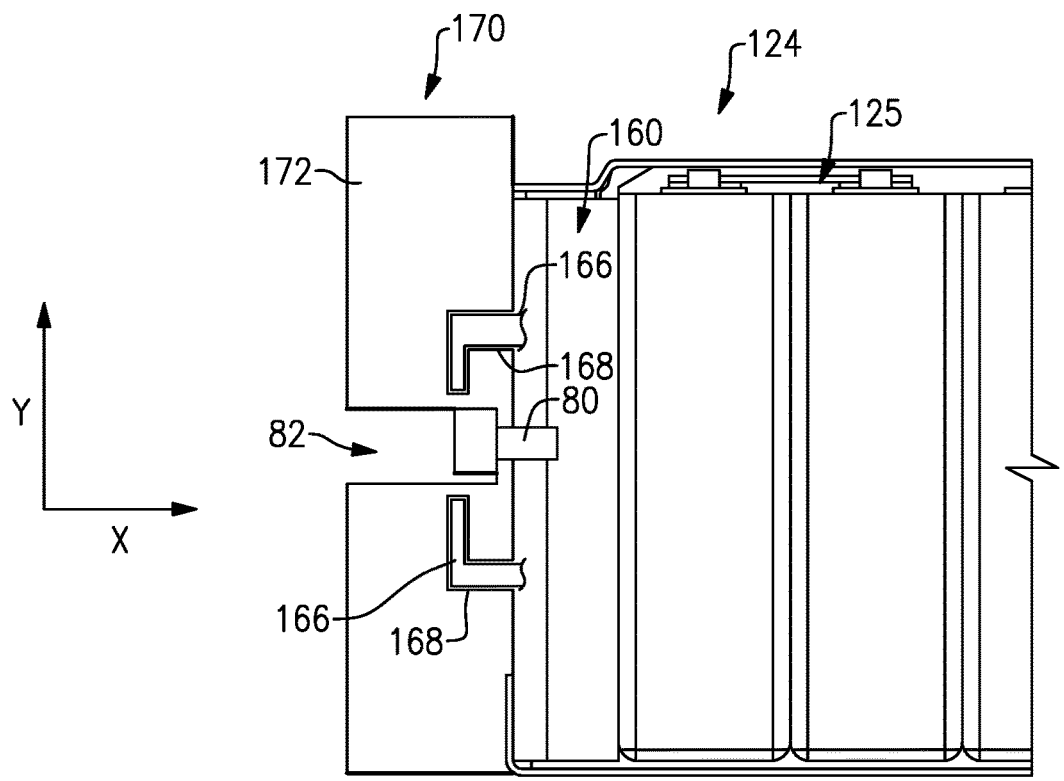
FIG. 5 illustrates another exemplary battery pack.

FIG. 5 illustrates portions of another exemplary battery pack 124. In this disclosure, like reference numbers designate like elements where appropriate and reference numerals with the addition of 100 or multiples thereof designate modified elements that are understood to incorporate the same features and benefits of the corresponding original elements.

The battery pack 124 includes a battery assembly 125 that may be slid into engagement with an enclosure 170. The enclosure 170 includes a plurality of walls 172 (only one wall is depicted in the side view of FIG. 5). In this embodiment, an array plate 160 of the battery assembly 125 includes multiple flanges 166 (rather than a single flange as shown in the embodiment of FIG. 4A) that may be received in corresponding grooves 168 formed in the wall 172 of the enclosure 170. The array plate 160 could include any amount of flanges 166.

In one non-limiting embodiment, the flanges 166, and the corresponding grooves 168, are L-shaped. However, other shapes are also contemplated within the scope of this disclosure. The L-shaped flanges 166 constrain the battery assembly 125 in each of an X-direction and a Y-direction relative to the enclosure 170. In addition, in this embodiment, the wall 172 may exert a compressive force against the battery assembly 125.

One or more fasteners 80 may optionally be inserted through an opening 82 in the wall 172 of the enclosure 170 and into the array plate 160. The fasteners 80 can be provided to secure the battery assembly 125 in place after it has been slid into the enclosure 170. The use of the fasteners 80 is not limited to the embodiment of FIG. 5 and could optionally be used with any battery assembly of this disclosure.

Figure 6:
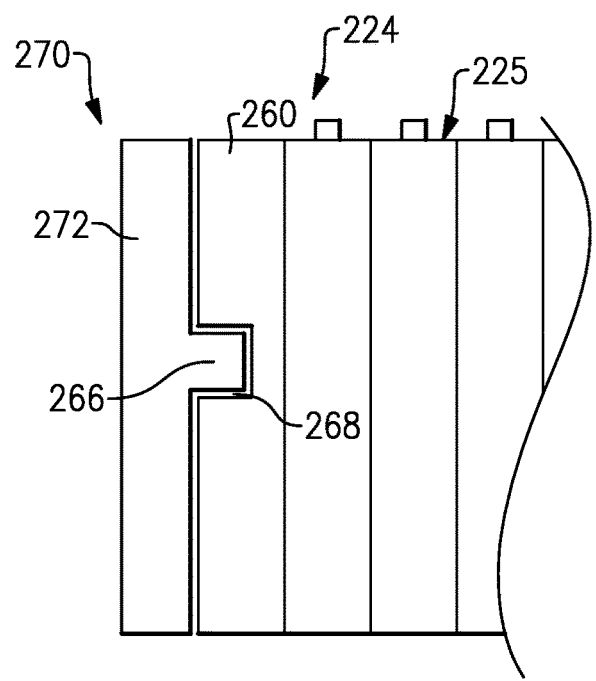
FIG. 6 illustrates another exemplary battery pack.

In the preceding embodiments, the flanges 66, 166 have been shown as part of the array plates 60, 160 and the grooves 68 have been shown as part of the enclosures 70, 170. However, an opposite configuration is also contemplated within the scope of this disclosure. For example, as shown in FIG. 6, a battery pack 224 may include a battery assembly 225 and an enclosure 270. The battery assembly 225 includes an array plate 260 having a groove 268. A flange 266 of a wall 272 of the enclosure 270 extends into the groove 268. The battery assembly 225 may be slid into the battery pack 224 by guiding the groove 268 of the battery assembly 225 over the flange 266.

Figure 7:
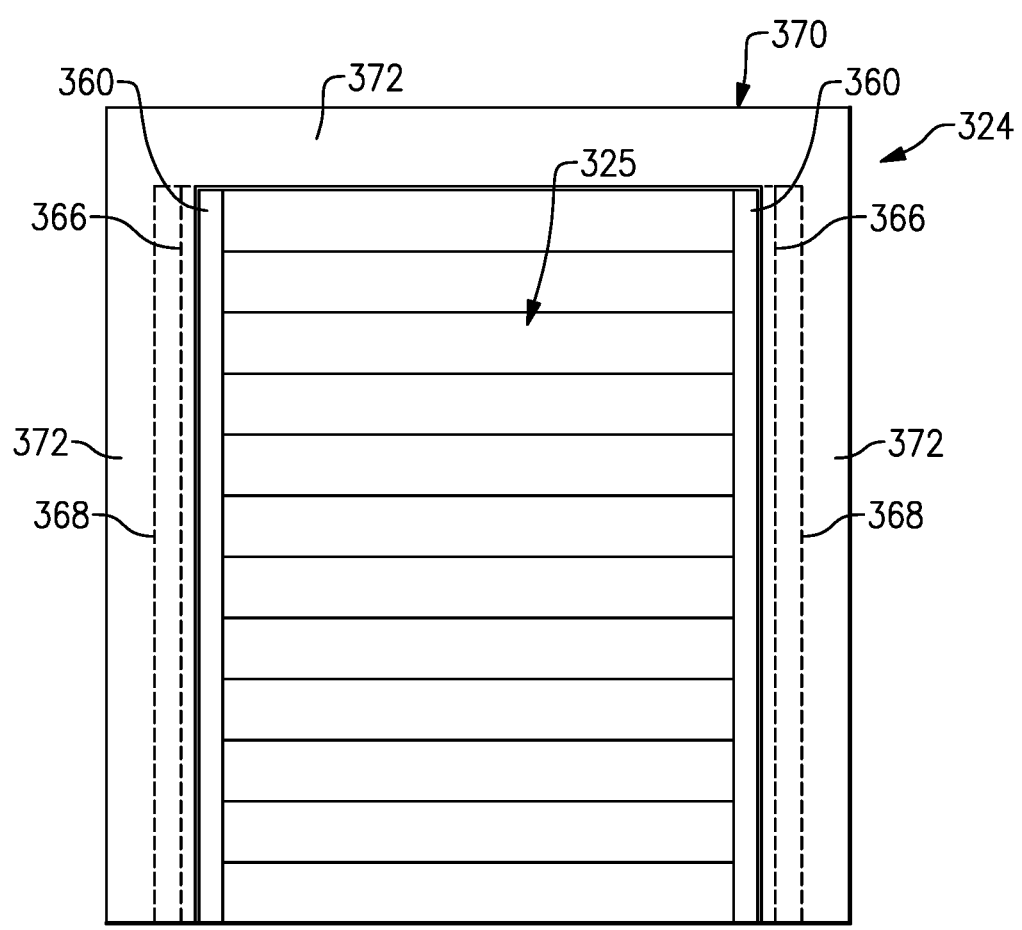
FIG. 7 illustrates yet another exemplary battery pack.

FIG. 7 is a top view of another battery pack 324. The battery pack 324 includes a battery assembly 325 that may be slid into engagement with an enclosure 370. The enclosure 370 includes a plurality of walls 372. In this embodiment, array plates 360 of the battery assembly 325 are configured as side walls of the assembly. The array plates 360 include a flange 366 that may be received in corresponding grooves 368 formed in the walls 372 of the enclosure 370. In other words, the battery assembly 325 may engage the enclosure 370 at its sidewalls rather than at its end walls as previously shown with respect to the embodiment of FIG. 4B.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
an enclosure that includes a plurality of extruded walls;
a battery assembly retained relative to said enclosure, wherein said battery assembly includes a plurality of stacked together battery cells that are axially constrained between a first array plate and a second array plate; and
one of said battery assembly and said enclosure includes a groove configured to receive a flange of the other of said battery assembly and said enclosure as said battery assembly is slid into engagement with said enclosure,
wherein said battery assembly includes said flange and said enclosure includes said groove,
wherein said flange extends from said first array plate or said second array plate of said battery assembly and said groove is formed in one of said plurality of extruded walls of said enclosure.

2. The battery pack as recited in claim 1, wherein said first array plate of said battery assembly includes a first side region facing toward a first battery cell of said plurality of stacked together battery cells and a second side region facing in a direction away from said first battery cell, and said second array plate includes a first side region facing toward a second battery cell of said plurality of stacked together battery cells and a second side region facing in a direction away from said second battery cell.

3. The battery pack as recited in claim 2, wherein said flange is disposed on said second side region of said first array plate or said second array plate.

4. The battery pack as recited in claim 1, wherein said groove extends horizontally across said one of said plurality of extruded walls of said enclosure.

5. The battery pack as recited in claim 1, wherein said first array plate and said second array plate are disposed at opposing longitudinal extents of said battery assembly, and each of said first array plate and said second array plate includes said flange.

6. The battery pack as recited in claim 1, wherein said battery assembly includes a plurality of flanges.

7. The battery pack as recited in claim 1, wherein said flange is L-shaped.

8. The battery pack as recited in claim 1, comprising at least one fastener extending through one of said plurality of extruded walls of said enclosure and into said first array plate or said second array plate of said battery assembly.

9. The battery pack as recited in claim 1, wherein said plurality of stacked together battery cells are lithium-ion battery cells.

10. The battery pack as recited in claim 1, wherein a first extruded wall of said plurality of extruded walls is positioned in a nested relationship with said first array plate and a second extruded wall of said plurality of extruded walls is positioned in a nested relationship with said second array plate.

* * * * *